(12) United States Patent
Irish et al.

(10) Patent No.: US 8,327,075 B2
(45) Date of Patent: Dec. 4, 2012

(54) METHODS AND APPARATUS FOR HANDLING A CACHE MISS

(75) Inventors: John D. Irish, Rochester, MN (US); Chad B. McBride, Rochester, MN (US); Andrew H. Wottreng, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1309 days.

(21) Appl. No.: 11/297,312

(22) Filed: Dec. 8, 2005

(65) Prior Publication Data

US 2007/0136532 A1   Jun. 14, 2007

(51) Int. Cl.
*G06F 12/12* (2006.01)
(52) U.S. Cl. .......... 711/133; 711/206; 711/E12.061; 711/E12.069
(58) Field of Classification Search .......... None
See application file for complete search history.

(56) References Cited

U.S. PATENT DOCUMENTS

2002/0069327 A1* 6/2002 Chauvel .......... 711/130
2002/0073282 A1* 6/2002 Chauvel et al. .......... 711/122

* cited by examiner

*Primary Examiner* — Denise Tran
(74) *Attorney, Agent, or Firm* — Dugan & Dugan PC

(57) ABSTRACT

In a first aspect, a first method is provided. The first method includes the steps of (1) providing a cache having a plurality of cache entries, each entry adapted to store data, wherein the cache is adapted to be accessed by hardware and software in a first operational mode; (2) determining an absence of desired data in one of the plurality of cache entries; (3) determining a status based on a current operational mode and a value of hint-lock bits associated with the plurality of cache entries; and (4) determining availability of at least one of the cache entries based on the status, wherein availability of a cache entry indicates that data stored in the cache entry can be replaced. Numerous other aspects are provided.

12 Claims, 5 Drawing Sheets

| HW_MH | SW_MH | Condition | Sub-Rule From Fig. 2 | Replacement Rule(s) for PT Cache Miss |
|---|---|---|---|---|
| 0 | 0 | — | — | Exception – Miss-Handling Process not Specified |
| 0 | 1 | — | — | Exception – Software Miss Handling Implies that Software Will Make Sure that the Entries in the Cache are Up-to-Date so that there Will not be Hardware Misses |
| 1 | 0 | 1-4<br>6<br>5 | 226-232<br>236<br>234 | 1) Replace Invalid Entries First<br>2) Replace Valid HL=0 Entries Based on LRU Second<br>3) Replace Valid HL=1 Entries Fourth Based on LRU |
| 1 | 1 | 1-4<br>6<br>5 | 226-232<br>236<br>234 | 1) Replace Invalid HL=0 Entries First<br>2) Replace Valid HL=0 Entries Based on LRU Second<br><br>An Exception Occurs if there is a Cache Miss when Software Miss Handling is On and All 4 HL=1 for a Congruance Class in the PT Cache |

FIG. 3

METHODS AND APPARATUS FOR HANDLING A CACHE MISS

FIELD OF THE INVENTION

The present invention relates generally to computer systems, and more particularly to methods and apparatus for handling a cache miss.

BACKGROUND

It may be advantageous to allow both hardware and software of a system to store data in an address translation cache (e.g., while handling a cache miss). An address cache miss can occur when an I/O device does an access to memory and the associated address is not already in the address cache. When an address cache miss occurs, address translation hardware will fetch from memory the associated address translation information for the new address and must replace an old entry in the address cache with the new data. However, because conventional systems are unable to prevent hardware from overwriting data stored in the cache by software, and vice versa, conventional systems generally are adapted to store data in the cache using only one of hardware or software. Consequently, improved methods and apparatus for handling a cache miss are desired.

SUMMARY OF THE INVENTION

In a first aspect of the invention, a first method is provided. The first method includes the steps of (1) providing a cache having a plurality of cache entries, each entry adapted to store data, wherein the cache is adapted to be accessed by hardware and software in a first operational mode; (2) determining an absence of desired data in one of the plurality of cache entries; (3) determining a status based on a current operational mode and a value of hint-lock bits associated with the plurality of cache entries; and (4) determining availability of at least one of the cache entries based on the status, wherein availability of a cache entry indicates that data stored in the cache entry can be replaced.

In a second aspect of the invention, a second method is provided. The second method includes the steps of (1) providing a cache having a plurality of cache entries, each entry adapted to store data, wherein the cache is adapted to be accessed by hardware and software in a first operational mode; (2) determining an absence of desired data in one of the plurality of cache entries; (3) determining a status based on a current operational mode and a value of removal status bits associated with the plurality of cache entries; and (4) determining availability of at least one of the cache entries based on the status, wherein availability of a cache entry indicates that data stored in the cache entry can be replaced.

In a third aspect of the invention, a first apparatus is provided. The first apparatus includes selection logic adapted to (1) couple to a cache having a plurality of cache entries, each entry adapted to store data, wherein the cache is adapted to be accessed by hardware and software in a first operational mode and determine an absence of desired data in one of the plurality of cache entries; (2) determine a status based on a current operational mode and a value of hint-lock bits associated with the plurality of cache entries; and (3) determine availability of at least one of the cache entries based on the status, wherein availability of a cache entry indicates that data stored in the cache entry can be replaced.

In a fourth aspect of the invention, a second apparatus is provided. The second apparatus includes selection logic adapted to (1) couple to a cache having a plurality of cache entries, each entry adapted to store data, wherein the cache is adapted to be accessed by hardware and software in a first operational mode and determine an absence of desired data in one of the plurality of cache entries; (2) determine a status based on a current operational mode and a value of removal status bits associated with the plurality of cache entries; and (3) determine availability of at least one of the cache entries based on the status, wherein availability of a cache entry indicates that data stored in the cache entry can be replaced.

In a fifth aspect of the invention, a first system is provided. The first system includes (1) a memory; (2) a cache memory of address translation logic, the cache memory having a plurality of cache entries, each entry adapted to store data, wherein the cache is adapted to be accessed by hardware and software in a first operational mode; (3) a processor adapted to execute software and couple to the cache memory; (4) an input/output (I/O) device coupled to the memory and cache memory; and (5) selection logic of the address translation logic coupled to the cache memory. The system is adapted to (a) determine an absence of desired data in one of the plurality of cache entries; (b) determine a status based on a current operational mode and a value of hint-lock bits associated with the plurality of cache entries; and (c) determine availability of at least one of the cache entries based on the status, wherein availability of a cache entry indicates that data stored in the cache entry can be replaced. Numerous other aspects are provided in accordance with these and other aspects of the invention.

Other features and aspects of the present invention will become more fully apparent from the following detailed description, the appended claims and the accompanying drawings.

BRIEF DESCRIPTION OF THE FIGURES

FIG. 3 is a chart illustrating how a cache miss is handled by the system in accordance with an embodiment of the present invention.

DETAILED DESCRIPTION

The present invention provides methods and apparatus for storing data in an address translation cache using hardware and software. For example, a system in accordance with an embodiment of the present invention may be adapted to operate in a mode in which hardware and/or software may store data in one or more of a plurality of cache entries. When data is stored in a cache entry, a bit may be set that corresponds to such a cache entry and indicates a removal status (e.g., hint-lock (HL)) of the data stored in such a cache entry.

When necessary, the system may select an entry of the cache from which data may be removed based on respective hint-lock bits associated with a plurality of cache entries and a mode of operation of the system (e.g., whether hardware and/or software may store data in the cache). For example, if the system determines desired data is not stored in one of a plurality of corresponding cache entries (e.g., a cache miss occurs), the system may select one of the corresponding entries based on the respective hint-lock bits associated with the corresponding entries and the system mode of operation. Thereafter, hardware or software may store the desired data in the selected entry. Further, the hardware or software may update the hint-lock bit associated with the selected entry.

In this manner, the present invention provides methods and apparatus for storing data in an address translation cache using hardware and software. More specifically, the present invention provides methods and apparatus in which software and/or hardware may be employed to handle an address translation cache miss. The present invention methods and apparatus may also allow software to pre-load address translation cache while hardware handles an address translation cache miss. The hint-lock bit corresponding to a cache entry may be employed to prevent removal of the entry from cache while handling a cache miss. Preventing this removal is especially important for those entries that software pre-loads into the address translation cache and expects to remain in the cache until an I/O device completes the memory accesses associated with the address translation cache entry. Even when software miss-handling is not used, this removal prevention also may be useful to minimize latency for accesses by specific high-speed I/O devices.

Figure 1:
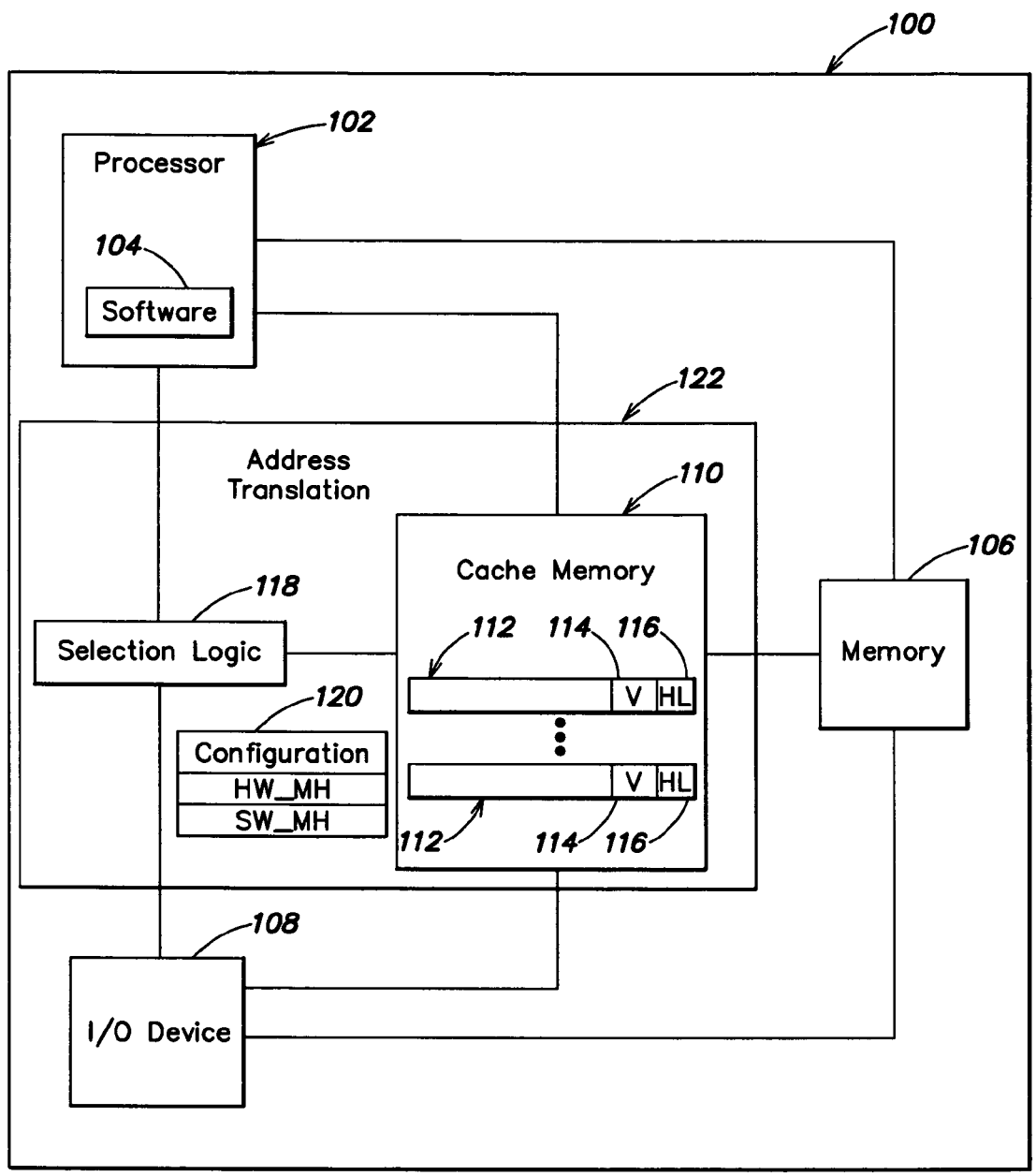
FIG. 1 is a block diagram of a system for handling a cache miss in accordance with an embodiment of the present invention.

FIG. 1 is a block diagram of a system for handling a cache miss in accordance with an embodiment of the present invention. With reference to FIG. 1, the system 100 for handling a cache miss may be a computer or another suitable device. The system 100 may include a processor 102 adapted to execute software 104. The processor 102 may be coupled to system memory 106 such as one or more DRAMs or other suitable memories. In this manner, the processor 102 (e.g., software 104 executed thereby) may read data from and/or write data to the memory 106. Similarly, the system 100 may include hardware such as one or more I/O devices 108 (only one shown) coupled to the system memory 106. The one or more I/O devices 108 may be adapted to read data from and/or write data to the memory 106.

To reduce latency when reading data from and/or writing data to the system memory 106 using the processor 102 or an I/O device 108, the system 100 may include a cache memory 110 (or alternatively a translation lookaside buffer (TLB)) adapted to locally store data (e.g., address translation data) which may also be stored in the system memory 106. The cache memory 110 may be coupled to the processor 102 and one or more I/O devices 108. The system 100 may be adapted to operate in one of a plurality of modes. For example, the system 100 may operate in a first mode (e.g., bit HW_MH='1' and bit SW_MH='1') in which only software may write data (e.g., to handle a cache miss) to the cache memory 110, a second mode (e.g., bit HW_MH='1' and bit SW_MH='0') in which only hardware may write data to the cache memory 110, and a third mode (e.g., bit HW_MH='1' and bit SW_MH='1') in which software and hardware may write data to the cache memory 110. A register 120 may store such bits indicating the system mode of operation. In this manner, the processor 102 (e.g., software 104 executed thereby) and/or address translation logic or hardware 122 which may collectively refer to at least the selection logic 118 and cache memory 110, due to an address cache miss on an access by an I/O device 108, may quickly read data from and/or write data to the cache memory 110.

The cache memory 110 may include a plurality of entries 112 adapted to store data. Entries 112 may include and/or be associated with respective valid bits 114 indicating whether data stored in the corresponding entry 112 is valid, and therefore, may be used for address translation. Further, entries 112 may include and/or be associated with respective hint-lock bits 116 (e.g., hint/lock bits) indicating whether data stored in the corresponding entry 112 may be removed from (e.g., by overwriting) the cache memory 110. In this manner, the hint-lock bits 116 may serve to prevent data stored in the cache memory 110 from inadvertently being overwritten.

More specifically, the system 100 may include selection logic 118 that may couple to the processor 102 and the one or more I/O devices 108. Further, the selection logic 118 may couple to the cache memory 110. The selection logic 118 may be adapted to determine whether one of a plurality of cache memory entries 112 corresponding to data (e.g., address translation data) may store (e.g., is available to store) such data, and if so, select one such entry from the plurality of corresponding cache memory entries 112 to store the data. The selection logic 118 may be adapted to make the above-described determination and selection based on respective hint-lock bits 116 and valid bits 114 associated with the entries 112 corresponding to the data and based on an operational state of the system 100. In this manner, software or hardware (e.g., address translation logic or hardware 122 acting in response to a cache memory miss for a memory address accessed by an I/O device 108) may write the data to a cache memory entry 112 without inadvertently overwriting data.

The cache memory 110 may be a set-associative cache memory (although the cache memory 110 may be configured in a different manner). Therefore, entries 112 of the cache memory 110 may be grouped into sets or congruence classes. Data to be written to the cache memory 110 may correspond to a set or congruence class, and therefore, the data should be written in an entry 112 included in such set or congruence class. For example, if the cache memory 110 is a four-way set-associative cache memory 110, each set or congruence class may include four entries 112. Consequently, to write data corresponding to a set or congruence class in the cache memory 110, one of the four entries 112 (if available) in the set or congruence class may be selected to store the data.

The selection logic 118 may include any suitable combination of logic, registers, memory or the like, and in at least one embodiment may comprise an application specific integrated circuit (ASIC). Details of the selection logic 118 are described below with reference to FIG. 2.

Figure 2:
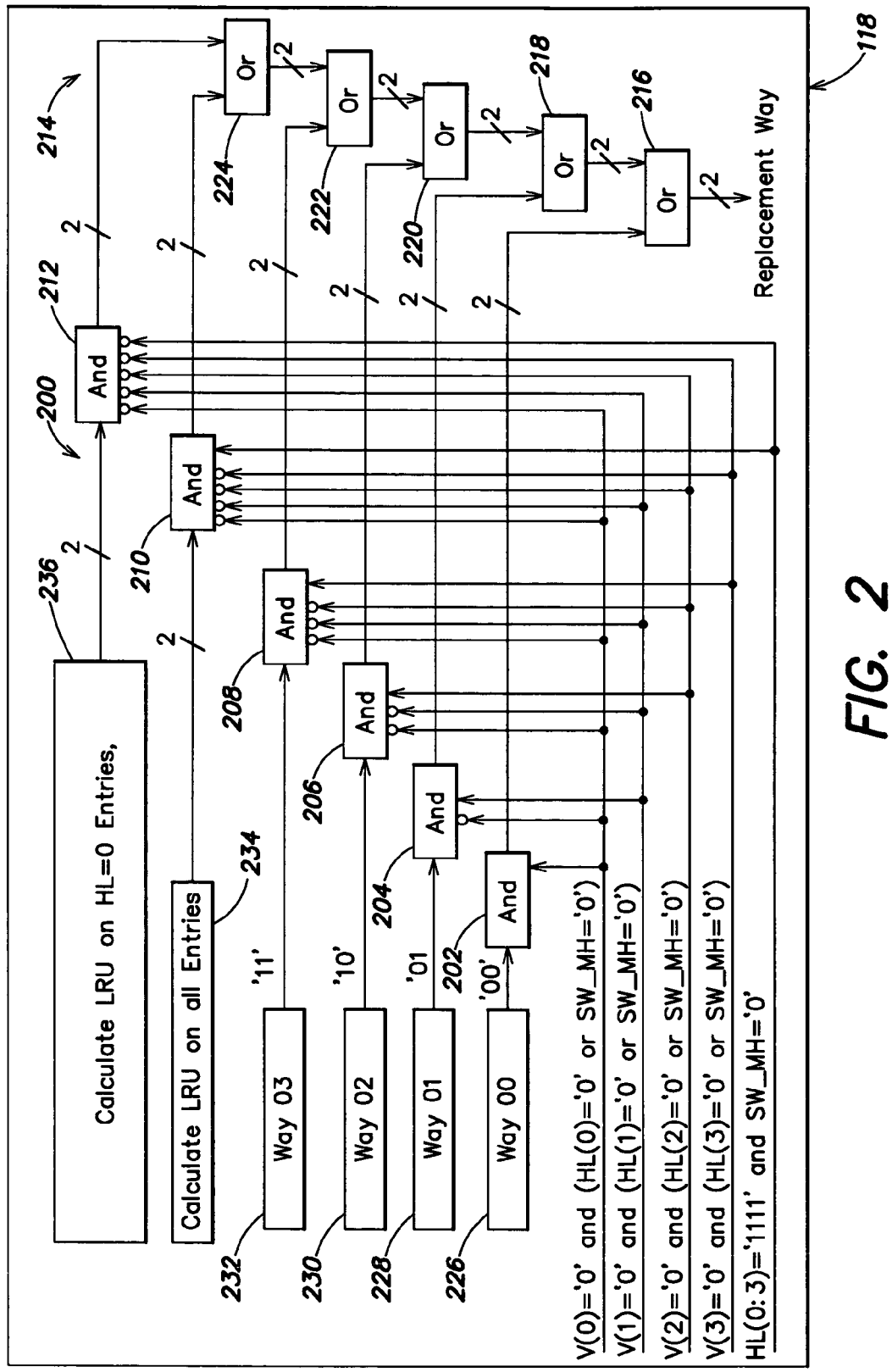
FIG. 2 is a block diagram of selection logic included in the system for handling a cache miss in accordance with an embodiment of the present invention.
Figure 4:
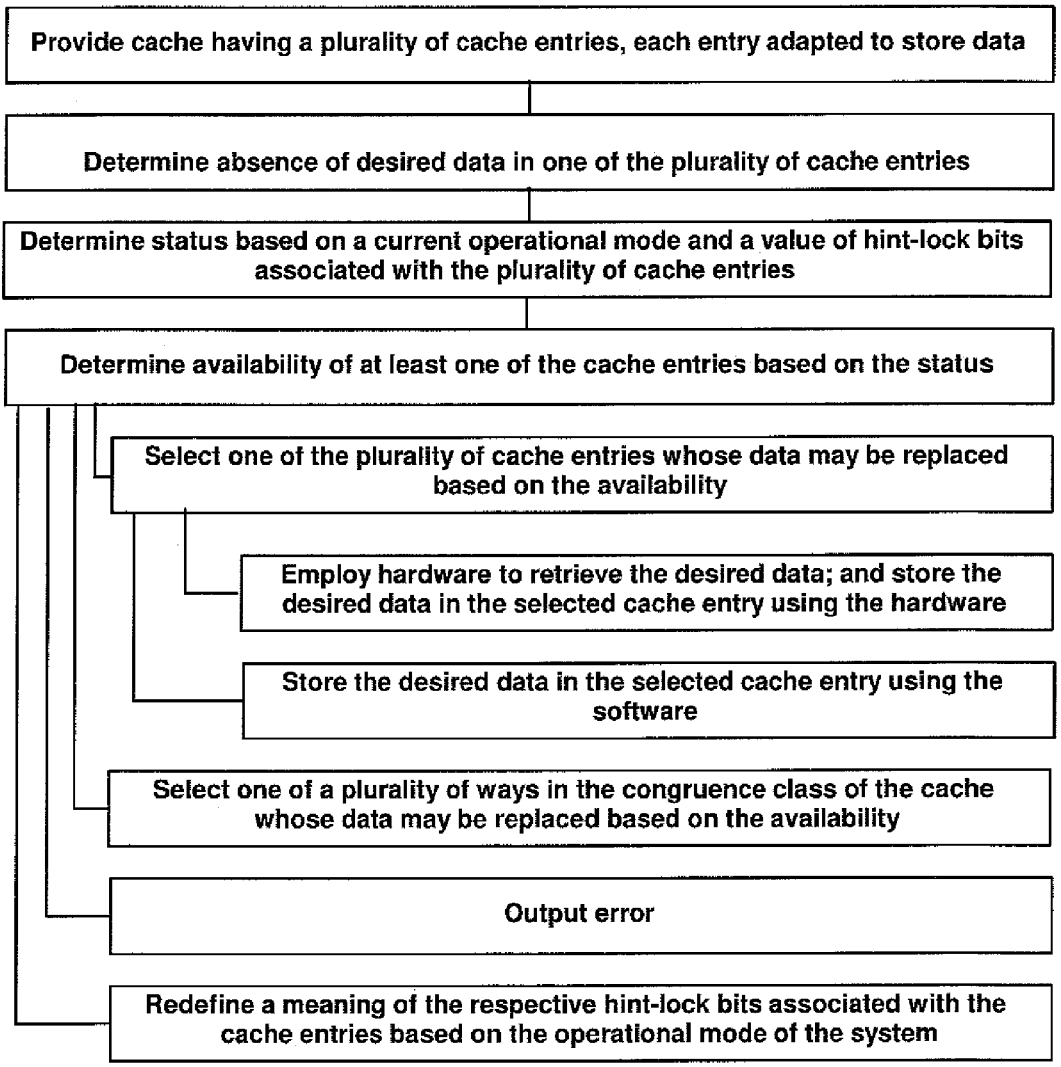
FIG. 4 is a flowchart of a method in accordance with an embodiment of the present invention.
Figure 5:
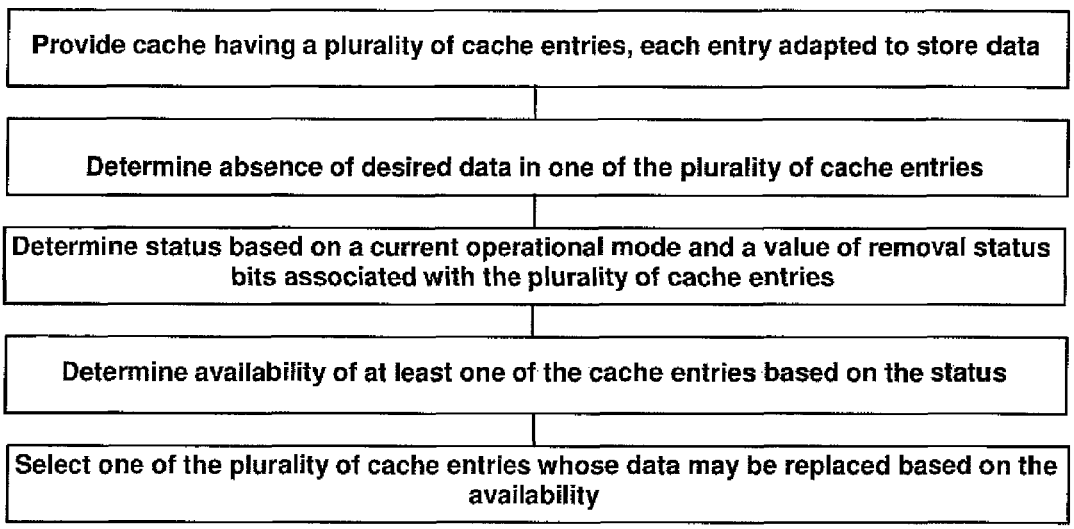
FIG. 5 is a flowchart of another method in accordance with an embodiment of the present invention.

FIG. 2 is a block diagram of selection logic 118 included in the system 100 for handling a cache miss in accordance with an embodiment of the present invention. With reference to FIG. 2, the selection logic 118 may be adapted to determine whether one of a plurality of cache memory entries 112 corresponding to data (e.g., address translation data) may store (e.g., is available to store) such data, and if so, select one of the plurality of corresponding cache memory entries 112 to store the data. It is assumed the selection logic 118 is adapted to couple to a four-way set-associative cache memory (although the selection logic 118 may be adapted to couple to a cache memory 110 having a different configuration). Further, it may generally be assumed that when software may not store data to the cache memory 110, hardware may store data to the cache memory 110. Therefore, the selection logic 118 may be adapted to determine whether one of the plurality of ways in a set or congruence class corresponding to data may store such data, and if so, select a way from the set or congruence class to store the data.

The selection logic 118 may access respective valid bits 114 and hint-lock bits 116 of entries 112 in the congruence class corresponding to the data to be written to the cache memory 110 to determine a status (e.g., condition) of one or more of such entries 112. Based on such bits and the operational mode of the system 100, the selection logic 118 may output an entry 112 (e.g., a way) resulting from one of a plurality of sub-rules (e.g., replacement sub-rules) employed by the selection logic 118. More specifically, the selection logic 118 may include ANDing logic 200 (e.g., first through sixth ANDing logic 202-212) and ORing logic 214 (e.g., first through fifth ORing logic 216-224) adapted to output an entry 112 (e.g., a way) resulting from one of the plurality of sub-rules based on such bits and the operational mode of the system 100.

Condition 1

For example, if the valid bit 114 associated with an entry 112 which is the first way of the congruence class indicates the entry 112 is not valid and either the hint-lock bit 116 associated with the first way indicates the way may be removed from the cache memory 110 or the system operates in a mode where only hardware may write data to the cache memory 110 (e.g., to handle a cache miss) (represented as [V(0)='0' and (HL(0)='0' or SW_MH='0')] in FIG. 2), the selection logic 118 will select the first way (replacement way) to which data may be written. The selection logic 118 may employ one or more portions of the ANDing logic 200 and the ORing logic 214 to output the selected way (e.g., which serves as a way whose data may be replaced (replacement way)).

Condition 2

Alternatively, if the above condition is not met and if the valid bit 114 associated with an entry 112 which is the second way of the congruence class indicates the entry 112 is not valid and either the hint-lock bit 116 associated with the second way indicates the way may be removed from the cache memory 110 or the system operates in a mode where only hardware may write data to the cache memory 110 (e.g., to handle a cache miss) (represented as [V(1)='0' and (HL(1)='0' or SW_MH='0')] in FIG. 2), the selection logic 118 will select the second way (replacement way) to which data may be written. The selection logic 118 may employ one or more portions of the ANDing logic 200 and the ORing logic 214 to output the selected way.

Condition 3

Alternatively, if the above conditions are not met and if the valid bit 114 associated with an entry 112 which is the third way of the congruence class indicates the entry 112 is not valid and either the hint-lock bit associated with the third way indicates the way may be removed from the cache memory 110 or the system 100 operates in a mode where only hardware may write data to the cache memory 110 (e.g., to handle a cache miss) (represented as [V(2)='0' and (HL(2)='0' or SW_MH='0')] in FIG. 2), the selection logic 118 will select the third way (replacement way) to which data may be written. The selection logic 118 may employ one or more portions of the ANDing logic 200 and the ORing logic 214 to output the selected way.

Condition 4

Alternatively, if the above conditions are not met and if the valid bit 114 associated with an entry 112 which is the fourth way of the congruence class indicates the entry 112 is not valid and either the hint-lock bit 116 associated with the fourth way indicates the way may be removed from the cache memory 110 or the system 100 operates in a mode where only hardware may write data to the cache memory 110 (e.g., to handle a cache miss) (represented as [V(3)='0' and (HL(3)='0' or SW_MH='0')] in FIG. 2), the selection logic 118 will select the fourth way (replacement way) to which data may be written. The selection logic 118 may employ one or more portions of the ANDing logic 200 and the ORing logic 214 to output the selected way.

Condition 5

Alternatively, if the above conditions are not met and if all hint-lock bits 116 associated with the entries (e.g., ways), respectively, indicate the corresponding way should preferably not be removed from the cache memory 110 (e.g., should be prevented from removal or is locked from removal) (represented as HL(0:3)='1111' in FIG. 2) and software miss handling is disabled (represented by SW_MH='0'), the selection logic 118 may employ a fifth sub-rule 234 to select a way to which data may be written. Despite the implied recommendation by the hint-lock bits that an entry not be removed, one entry must still be selected for removal in order to write the new entry corresponding to the cache miss. The selection logic 118 may employ one or more portions of the ANDing logic 200 and the ORing logic 214 to output the selected way. According to the fifth sub-rule 234, the selection logic 118 may determine the least recently used (LRU) entry (e.g., way) of the entries (e.g., calculate LRU on all entries) and select such entry to be written. Condition 5 may be met while the system is operating in a mode in which hardware (e.g., address translation hardware 122 acting in response to a cache memory miss for a memory address accessed by an I/O device 108) and/or software 104 may write the data to a cache memory entry 112 (e.g., in response to a cache miss).

Condition 6

Alternatively, if the above conditions are not met and if all hint-lock bits 116 associated with the ways, respectively, do not indicate the corresponding entry may be prevented from removal from the cache memory 110 (e.g., should be prevented from removal or is locked from removal) (represented as not HL(0:3)='1111' in FIG. 2), the selection logic 118 may employ a sixth sub-rule 236 to select a way to which data may be written. The selection logic 118 may employ one or more portions of the ANDing logic 200 and the ORing logic 214 to output the selected way. According to the sixth sub-rule 236, the selection logic 118 may select the way by determining the least recently used (LRU) way of the ways with a hint-lock bit 116 indicating the corresponding way may be removed from cache memory 110 (if any).

Alternatively, if the selection logic 118 is unable to select a way, the selection logic 118 may output an error. The selection logic 118 described above is exemplary. Therefore, the selection logic 118 may be configured differently. For example, the selection logic 118 may include a larger or smaller amount of logic and/or different logic or handle a different number of ways in the cache congruence class. Further, the selection logic 118 may test for a larger or smaller amount of statuses (e.g., conditions) and/or different statuses. Additionally, the selection logic 118 may employ a larger or smaller amount of sub-rules and/or different sub-rules).

During operation, the system 100 may experience a cache miss. For example, the system 100 may access the cache memory 110 and determine desired data is not stored in the cache memory 110. Therefore, the system 100 may employ the selection logic 118 to select an entry 112 from the set or congruence class corresponding to the desired data and store the desired data in the selected entry 112 using hardware or software (depending on the operational mode of the system 100). In this manner, the system 100 may handle a cache miss. More specifically, FIG. 3 is a chart 300 illustrating how a cache miss is handled by the system 100 (e.g., only when hardware miss handling is enabled) in accordance with an embodiment of the present invention. With reference to FIG. 3, the system 100 may employ different replacement rules (e.g., one or more sub-rules) to handle a cache miss based on the operational mode of the system 100. In this manner, the system 100 may determine a cache entry 112 whose currently-stored data may be replaced (e.g., overwritten by) the desired data. For example, the system 100 may operate in a first mode in which neither software nor hardware may store data to the cache memory 110 (e.g., to handle a cache miss). Therefore, no process (e.g., software miss handling (SW_MH) or hardware miss handling (HW_MH)) is specified to handle the cache miss. Consequently, as illustrated by the first row 302 of the chart 300, in response to a cache miss, an exception may occur, and therefore, the system 100 may output an error.

Alternatively, the system 100 may operate in a second mode in which hardware may not write to the cache memory 110 (e.g., HW_MH='0') and software may write to the cache memory (e.g., SW_MH='1'). When software 104 may write data to the cache memory 110, the software 104 should ensure that data stored in the cache memory 110 is accurate (e.g., up to date). Therefore, a cache miss should not occur when hardware attempts to access (e.g., read data from) the cache memory 110. Consequently, as illustrated by the second row 304 of the chart 300, in response to a cache miss, an exception may occur, and therefore, the system 100 may output an error.

Alternatively, the system 100 may operate in a third mode in which hardware may write to the cache memory 110 (e.g., HW_MH='1') and software may not write to the cache memory (e.g., SW_MH='0'). As illustrated by the third row 306 of the chart 300, in response to a cache miss when looking for desired data, to determine a way (of a set or congruence class corresponding to the desired data) whose currently-stored data may be replaced (e.g., overwritten by) the desired data, the system 100 may test for the first through sixth conditions described above, and if one or more of the first through sixth conditions is met, employ the appropriate sub-rule 226-236 to select a way to store the desired data.

Alternatively, the system 100 may operate in a fourth mode in which both hardware and software may write to the cache memory 110 (e.g., HW_MH is on and SW_MH is on). As illustrated by the fourth row 308 of the chart 300, in response to a cache miss when looking for desired data, to determine a way (of a set or congruence class corresponding to the desired data) whose currently-stored data may be replaced (e.g., overwritten by) the desired data, the system 100 may test for Conditions 1 through 4 and Condition 6, employing the appropriate sub-rule 226-232 and 236 to select a way to store the desired data.

The above-described method of handling a cache miss based on the operational mode of the system 100 and respective hint-lock bits 116 associated with ways of the cache memory 110 are exemplary. Consequently, a larger or smaller number of rules and/or different rules may be employed to handle a cache miss while the system 100 operates in any mode.

Through use of the present methods and apparatus, both hardware and software may store data in a cache memory of a system 100 (e.g., to handle a cache miss). The system 100 may handle the cache miss based on an operational mode of the system 100 (e.g., whether software miss handling and/or hardware miss handling is employed) and respective hint-lock bits 116 associated with cache memory entries 112. The definition of the hint-lock bits 116 may change (e.g., dynamically) based on the operational mode of the system 100. In this manner, the present invention may provide methods and apparatus for allowing simultaneous hardware and software miss handling of a cache memory 110 (e.g., a page table cache, translation lookaside buffer, etc.) and for redefining the hint-lock bit 116 depending on whether software and/or hardware miss handling is enabled in the system 100. Consequently, the present invention may promote scalability to multiprocessor and/or multithread environments (in which applications may have different miss-handling policies, respectively) while preserving traditional functionality such as hardware miss handling. In this manner, the present invention enables both software and hardware miss handling to coexist in functional mode on the system 100. The present invention may enable hardware and software to simultaneously store data in the cache memory 110 by employing a single bit per cache memory entry 112.

The foregoing description discloses only exemplary embodiments of the invention. Modifications of the above disclosed apparatus and methods which fall within the scope of the invention will be readily apparent to those of ordinary skill in the art. For instance, in a broader aspect, the present invention may include methods and apparatus for (1) providing a cache having a plurality of cache entries, each entry adapted to store data, wherein the cache is adapted to be accessed by hardware and software in a first operational mode; (2) determining an absence of desired data in one of the plurality of cache entries; (3) determining a status based on a current operational mode and a value of hint-lock bits associated with the plurality of cache entries; and (4) determining availability of at least one of the cache entries based on the status, wherein availability of a cache entry indicates that data stored in the cache entry can be replaced.

For example, the cache may operate in a first mode in which software and/or hardware may store data therein, a second mode in which only software may store date therein or a third mode in which only hardware may store date therein (although the cache (and an apparatus including the cache) may operate in a larger or smaller number of modes). In such apparatus, an absence of desired data in one of the plurality of cache entries (e.g., an occurrence of a cache miss) may be determined. The plurality of cache entries may be ways of a congruence class of the cache. Further, in such apparatus, a status based on a current operational mode and a value of hint-lock bits associated with the plurality of cache entries may be determined and availability of at least one of the cache entries based on the status may be determined by testing for the conditions as described above with reference to FIGS. 2 and 3. Further, the apparatus may employ a selection algorithm based on the tested conditions to select a way whose data may be replaced by the desired data as described above with reference to FIGS. 2 and 3.

Further, the methods and apparatus are described above with reference to a page table cache and miss handling. However, it should be understood that when the present invention describes the handling of a page table cache, the assumption is that software will pre-load entries into the cache in order to avoid an exception, which terminates the associated I/O access, and when the present invention includes a processor translation lookaside buffer (TLB), software can handle TLB misses after they occur since processors typically provide mechanisms to retain appropriate state and allow instruction execution to be restarted at the point in the program where the TLB miss occurred.

Additionally, in embodiments in which a TLB is employed as a translation mechanism (e.g., for a processor 102 of the system 100) software 104 may handle an exception (e.g., occurring because no cache entry 112 can be replaced) by loading the desired data into the TLB.

Accordingly, while the present invention has been disclosed in connection with exemplary embodiments thereof, it should be understood that other embodiments may fall within the spirit and scope of the invention, as defined by the following claims.

The invention claimed is:

1. A method, comprising:
providing a cache having a plurality of cache entries, each entry adapted to store data, wherein the cache is adapted to be accessed by hardware and software in a first operational mode;
determining an absence of desired data in one of the plurality of cache entries;
determining a status based on a current operational mode and a value of hint-lock bits associated with the plurality of cache entries;
determining availability of at least one of the cache entries based on the status, wherein availability of a cache entry indicates that data stored in the cache entry can be replaced; and
redefining a meaning of the respective hint-lock bits associated with the cache entries based on the operational mode of the system that is one of the first operational mode, a second operational mode in which only software accesses the cache, and a third operational mode in which only the hardware accesses the cache.

2. The method of claim 1 further comprising selecting one of the plurality of cache entries whose data may be replaced based on the availability.

3. The method of claim 2 further comprising:
employing hardware to retrieve the desired data; and storing the desired data in the selected cache entry using the hardware.

4. The method of claim 2 further comprising storing the desired data in the selected cache entry using the software.

5. The method of claim 1 wherein the plurality of cache entries are ways in a congruence class of the cache.

6. The method of claim 5 further comprising selecting one of a plurality of ways in the congruence class of the cache whose data may be replaced based on the availability.

7. The method of claim 1 further comprising outputting an error.

8. An apparatus, comprising:
selection logic adapted to:
couple to a cache having a plurality of cache entries, each entry adapted to store data, wherein the cache is adapted to be accessed by hardware and software in a first operational mode and determine an absence of desired data in one of the plurality of cache entries;
determine a status based on a current operational mode and a value of hint-lock bits associated with the plurality of cache entries;
determine availability of at least one of the cache entries based on the status, wherein availability of a cache entry indicates that data stored in the cache entry can be replaced; and
redefine a meaning of the respective hint-lock bits associated with the cache entries based on the operational mode of the system that is one of the first operational mode, a second operational mode in which only software accesses the cache, and a third operational mode in which only the hardware accesses the cache.

9. The apparatus of claim 8 wherein the selection logic is further adapted to select one of the plurality of cache entries whose data may be replaced based on the availability.

10. The apparatus of claim 8 wherein the plurality of cache entries are ways in a congruence class of the cache.

11. The apparatus of claim 10 wherein the selection logic is further adapted to select one of a plurality of ways in the congruence class of the cache whose data may be replaced based on the availability.

12. The apparatus of claim 8 wherein the selection logic is further adapted to output an error.

* * * * *